(12) United States Patent
Elicker et al.

(10) Patent No.: US 11,603,886 B2
(45) Date of Patent: Mar. 14, 2023

(54) GUIDE CARRIAGE OF A LINEAR GUIDE AND METHOD FOR PRODUCING A HEAD PIECE OF A GUIDE CARRIAGE

(71) Applicant: Schaeffler Technologies AG & Co. KG, Herzogenaurach (DE)

(72) Inventors: Thomas Elicker, Breitenbach (DE); Martin Menges, Homburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2 days.

(21) Appl. No.: 17/295,492

(22) PCT Filed: Aug. 27, 2019

(86) PCT No.: PCT/DE2019/100773
§ 371 (c)(1),
(2) Date: May 20, 2021

(87) PCT Pub. No.: WO2020/108680
PCT Pub. Date: Jun. 4, 2020

(65) Prior Publication Data
US 2022/0003274 A1 Jan. 6, 2022

(30) Foreign Application Priority Data
Nov. 26, 2018 (DE) .................... 102018129652.5

(51) Int. Cl.
*F16C 29/06* (2006.01)
*F16C 33/66* (2006.01)
*F16K 15/14* (2006.01)

(52) U.S. Cl.
CPC ...... *F16C 33/6674* (2013.01); *F16C 29/0609* (2013.01); *F16C 29/0635* (2013.01);
(Continued)

(58) Field of Classification Search
CPC .............. F16C 29/0609; F16C 29/0635; F16C 29/0638; F16C 29/064; F16C 29/0645;
(Continued)

(56) References Cited

U.S. PATENT DOCUMENTS 5,399,023 A * 3/1995 Winkelmann ...... F16C 33/6648
384/15
6,203,199 B1 * 3/2001 Pfeuffer .............. F16C 33/6622
384/13
(Continued)

FOREIGN PATENT DOCUMENTS

DE   10332922   2/2005
DE   102006055196   5/2008
(Continued)

*Primary Examiner* — Phillip A Johnson
(74) *Attorney, Agent, or Firm* — Volpe Koenig (57) ABSTRACT

A guide carriage (1) of a linear guide includes a circulation channel (8) for rolling bodies (2), which is formed from a load section (3), two deflection sections (5) and a return section (4). A valve (16) arranged in a lubricant channel (10) to prevent the back flow of lubricant from the circulation channel (8) is arranged at a supply point (13) for supplying lubricating agent to one of the deflection sections (5), and the deflection section (5) is delimited by a deflection shell (9) located in an end piece (7). The valve (16) is formed integrally with at least one of the elements deflection shell (9) and end piece (7).

7 Claims, 7 Drawing Sheets

(52) U.S. Cl.
CPC ........ *F16C 33/6625* (2013.01); *F16K 15/147* (2013.01); *F16C 2208/20* (2013.01); *F16C 2220/04* (2013.01); *F16C 2300/02* (2013.01)

(58) Field of Classification Search
CPC ................ F16C 29/0647; F16C 29/065; F16C 29/0652; F16C 29/0657; F16C 29/0659; F16C 29/0661; F16C 29/0664; F16C 29/0666; F16C 33/6622; F16C 33/6625; F16C 33/6674; F16C 2208/20; F16C 2220/04; F16K 15/147
See application file for complete search history.

(56) References Cited

U.S. PATENT DOCUMENTS

| | | | |
|---|---|---|---|
| 6,443,619 B1 * | 9/2002 | Dutsch | ................. F16C 29/08 |
| | | | 384/15 |
| 7,435,000 B2 | 10/2008 | Neufang et al. | |
| 8,545,101 B2 | 10/2013 | Neufang | |
| 9,062,716 B2 * | 6/2015 | Dittmar | ............... F16C 29/0633 |
| 2009/0136164 A1 | 5/2009 | Pfeuffer et al. | |

FOREIGN PATENT DOCUMENTS

| | | |
|---|---|---|
| DE | 102007056862 | 5/2009 |
| DE | 102009016163 | 10/2010 |
| DE | 102011002427 | 7/2012 |
| DE | 102013221472 | 4/2015 |

* cited by examiner

GUIDE CARRIAGE OF A LINEAR GUIDE AND METHOD FOR PRODUCING A HEAD PIECE OF A GUIDE CARRIAGE

CROSS-REFERENCE TO RELATED APPLICATIONS

This application is the U.S. National Phase of PCT Appln. No. PCT/DE2019/100773, filed Aug. 27, 2019, which claims priority to DE 102018129652.5, filed Nov. 26, 2018, the entire disclosures of which are incorporated by reference herein.

TECHNICAL FIELD

The disclosure relates to a guide carriage formed as part of a linear guide. In addition, the disclosure relates to a method for producing a head piece as a component of such a guide carriage.

BACKGROUND

A generic guide carriage is known, for example, from DE 10 2006 055 196 A1. The guide carriage provides raceways for rolling bodies that furthermore contact a guide rail. When a linear guide unit, which comprises the guide carriage and the guide rail, is in operation, the rolling bodies roll in several closed circulation channels. The section of each circulation channel in which the rolling bodies contact both the guide carriage and the guide rail is referred to as the load section. From the load section, the rolling bodies are guided via a deflection section into a return section and from there are guided back into the load section via a further deflection section. The guide carriage according to DE 10 2006 055 196 A1 can be supplied with lubricant via the deflection section. In this case, a passage opening for introducing lubricant is located in an outer deflection piece of the deflection section. To prevent undesired drainage of lubricant from the deflection channel, a valve is fixed to the passage opening.

A further guide carriage of a linear rolling bearing is disclosed in DE 103 32 922 A1. In this case, too, there is a valve which enables the inflow of lubricants and prevents the outflow of lubricants. The valve has a slot which is provided for the passage of lubricant and which crosses the cross section of a lubricant channel and which is delimited by slot surfaces, wherein the slot surfaces rest against one another when the valve is closed and the slot is closed.

A guide carriage of a linear rolling bearing is known from DE 10 2009 016 163 A1, which has a micropump for pumping lubricating agent. The micropump can be designed as a piezoelectric diaphragm pump.

SUMMARY

The object of the disclosure is to further develop a guide carriage of a linear guide that enables targeted lubrication compared to the prior art mentioned, in particular in terms of manufacturing aspects.

According to the disclosure, this object is achieved by a guide carriage having one or more of the features described herein. The object is also achieved by a method for producing a head piece of a guide carriage having one or more of the features described. The configurations and advantages of the disclosure explained below in connection with the production method also apply analogously to the device, that is the guide carriage, and vice versa.

In a basic concept known per se, the guide carriage comprises a plurality of closed circulation channels for rolling bodies, wherein each circulation channel is formed from a load section, two deflection sections and a return section. Here, the deflection sections as well as the return section lie within the guide carriage, whereas the load section is also delimited by the associated guide rail. At a supply point located in the guide carriage in a lubricant channel for supplying lubricating agent to one of the deflection sections, a valve is arranged for preventing the back flow of lubricant from the circulation channel. The deflection section, that is to say a part of the annularly closed channel in which the rolling bodies are guided, is delimited within the guide carriage by a deflection shell located in an end piece of the guide carriage.

According to the disclosure, said valve, which has the function of a check valve, is formed integrally with at least one of the elements deflection shell and end piece.

Here, the valve can be formed as an integral component of the deflection shell or as an integral component of the end piece receiving the deflection shell. It is also possible for the deflection shell and the end piece to be combined to form an integral component which directly forms the valve. In this case the valve is preferably a plastic part.

Among other things, the valve ensures that the lubricant channel in the guide carriage does not run empty between two lubrication intervals. The lubricant channel therefore need not be filled in the next lubrication process before lubricant can be transferred to the deflection sections.

If the valve is a component of the deflection shell, there is preferably an annular sealing section located radially outside the valve, which is also an integral component of the deflection shell and, for example, rests against a flat sealing surface of the end piece. Here, the sealing section can protrude as a toroidal elevation from an end face of the deflection shell. In modified configurations, annular raised and recessed structures surrounding the valve can be formed on the surfaces of the deflection shell and the end piece that rest against one another and are to be sealed against one another, so that overall a labyrinth-like seal is provided. A separate sealing element, for example in the form of a conventional O-ring, is optionally installed.

Also in embodiments in which the valve is formed directly by the end piece, different variants of the seal between the end piece and the deflection shell are possible. For example, in this case the valve is surrounded by an annular extension of the deflection shell, an annular sealing section being formed by the end piece radially outside the annular extension. The annular extension, which is formed by the deflection shell, can also be used as an assembly aid when assembling the deflection shell and the end piece.

Regardless of whether the valve is integrated into the deflection shell or the end piece, the injection molding production of the plastic element concerned preferably takes place using the two-component injection molding process. This means that plastics of different hardness are bonded together during injection molding. Sections of the element to be produced, which should have sealing or valve properties with respect to lubricating agent, are made of a softer material compared to surrounding sections.

This also applies in embodiments in which the functions of the deflection section, the end piece and the valve are taken over by one and the same plastic part. In this case, the entire section functioning as the deflection shell can be produced from a softer plastic than the section formed as the end piece.

Particularly in cases in which the valve is formed directly by the deflection shell, it is also possible to produce the entire part—here the deflection shell—from a single plastic material, provided that the part in question offers sufficient flexibility in the thin-walled areas of the valve. In general, the valve can be produced from plastic either with the deflection shell or with a separate end piece or with an end piece that is also formed as a deflection shell, either with the same material or with a non-uniform material.

As far as the design of the valve is concerned, a wide range of variants known in principle from the documents DE 10 2006 055 196 A1 and DE 103 32 922 A1 are suitable for the guide carriage.

The rolling bodies of the linear guide, which are guided in endless tracks in the guide carriage, can be balls or rollers. Optionally, the rolling bodies are guided in a chain or through spacers.

BRIEF DESCRIPTION OF THE DRAWINGS

In the following, several exemplary embodiments of the disclosure are explained in more detail by means of a drawing. In the figures.

DETAILED DESCRIPTION

Unless otherwise stated, the following explanations relate to all exemplary embodiments. Parts that correspond to each other or have basically the same effect are marked with the same reference symbols in all figures.

A guide carriage 1 is part of a linear guide, with regard to the function of which reference is made to the prior art cited at the outset. Rolling bodies 2 roll between a guide rail of the linear guide and the guide carriage 1 in a plurality of closed circulation channels 8, which are largely formed within the guide carriage 1.

Each circulation channel 8 is composed of a load section 3, a return section 4 and two deflection sections 5, which connect the load section 3 to the return section 4. In addition to the guide carriage 1, the rolling bodies 2 contact the guide rail exclusively in the load section 3. A support body of the guide carriage 1 is denoted by 6. End pieces 7, in which the deflection sections 5 are formed, are fixed to the end faces of the support body 6. Each deflection section 5 is delimited on the outside by a deflection shell 9 and on the inside by an inner deflector 12. Here, an outer deflection 11 is formed by the deflection shell 9. The deflection section 5 can be supplied with lubricant from the outside via a lubricant channel 10 which runs through the end piece 7.

A supply point via which the lubricant can be introduced from the lubricant channel 10 into the deflection shell 9 is denoted by 13. After the lubricant has passed the supply point 13, it flows through a passage opening 14 in the deflection shell 9 into the deflection section 5. A valve 16 at the supply point 13 prevents lubricant from flowing back.

The subassembly or structural unit made up of deflection shell 9 and end piece 7 is referred to as head piece 26 in the present cases, irrespective of the manufacturing design. The head piece 26 is closed on the end face of the guide carriage 1 by a cover 17. A seal 15 is inserted between the cover 17 and the head piece 26, which seals the guide carriage 1 with respect to the guide rail.

Figure 1:
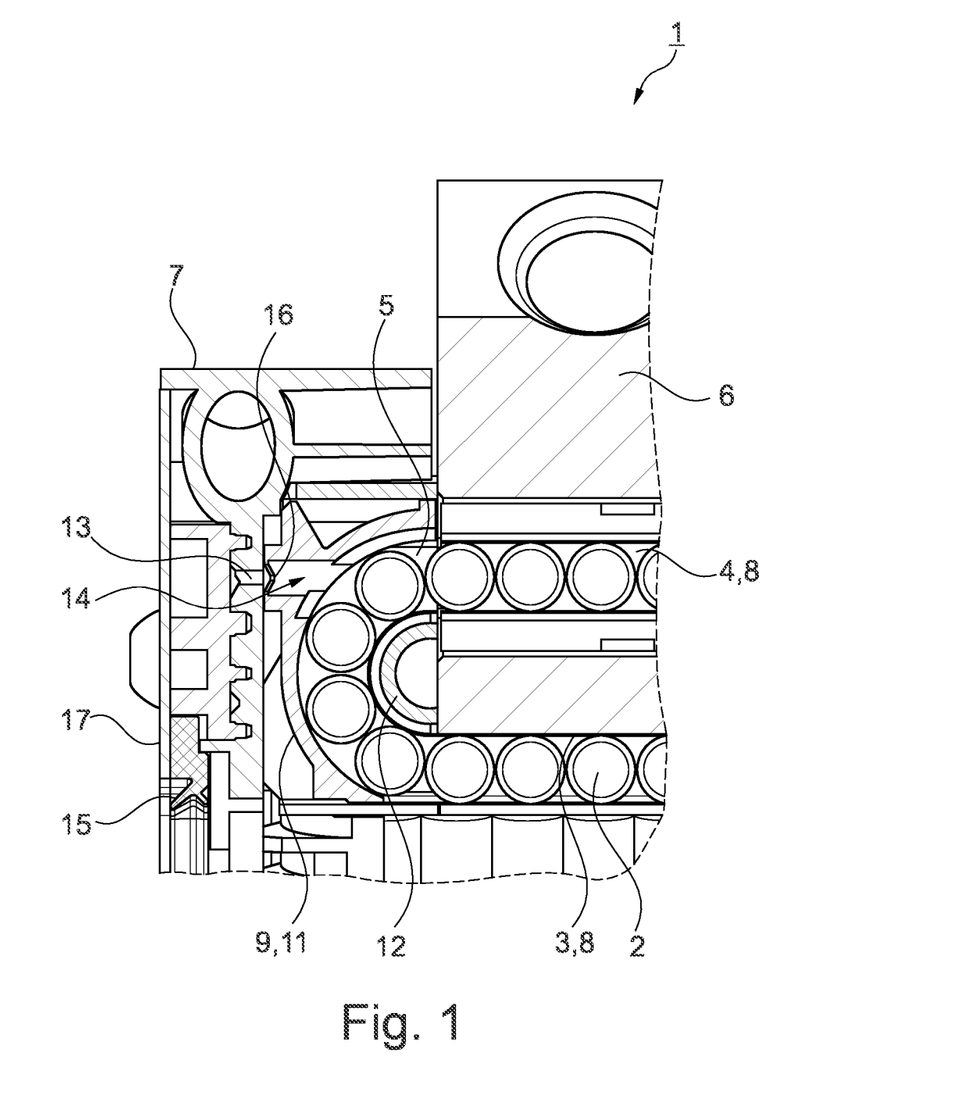
FIG. 1 shows a section of a guide carriage of a linear guide.
Figure 2:
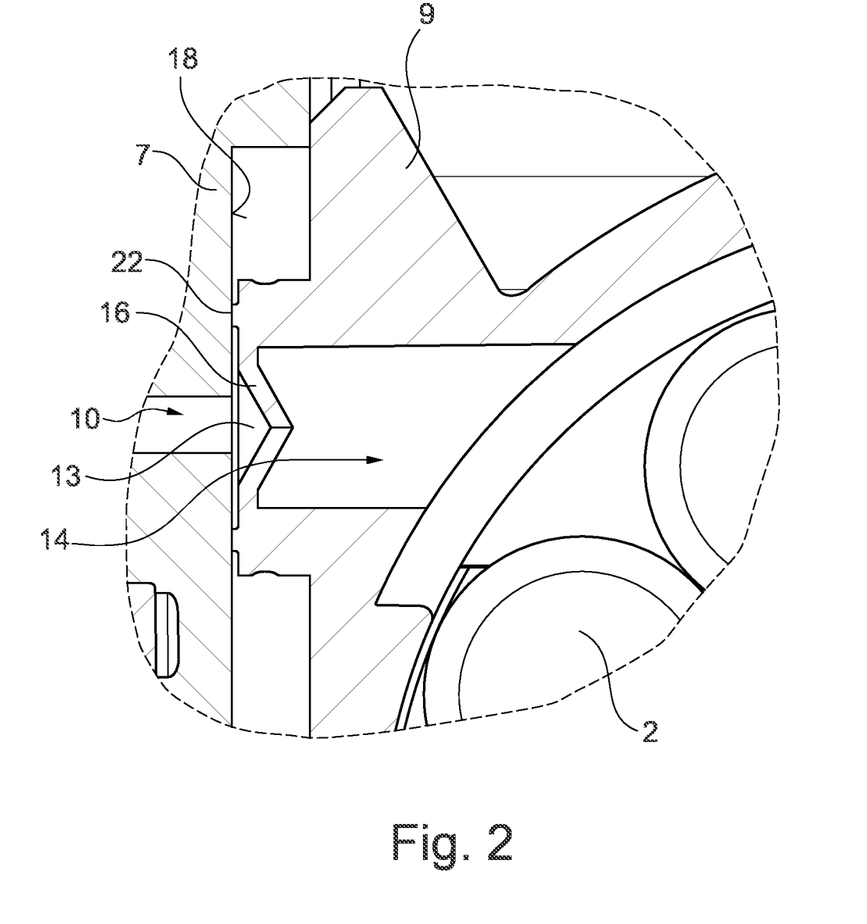
FIG. 2 shows a detail of the arrangement according to FIG. 1.

In the exemplary embodiment according to FIGS. 1 and 2, the valve 16 is formed directly by the deflection shell 9. Radially outside of the valve 16 there is a ring-shaped, circumferential, bead-like sealing section 22, which is also formed directly by the deflection shell 9. The sealing section 22 rests against a planar sealing surface 18 of the end piece 7.

Figure 3:
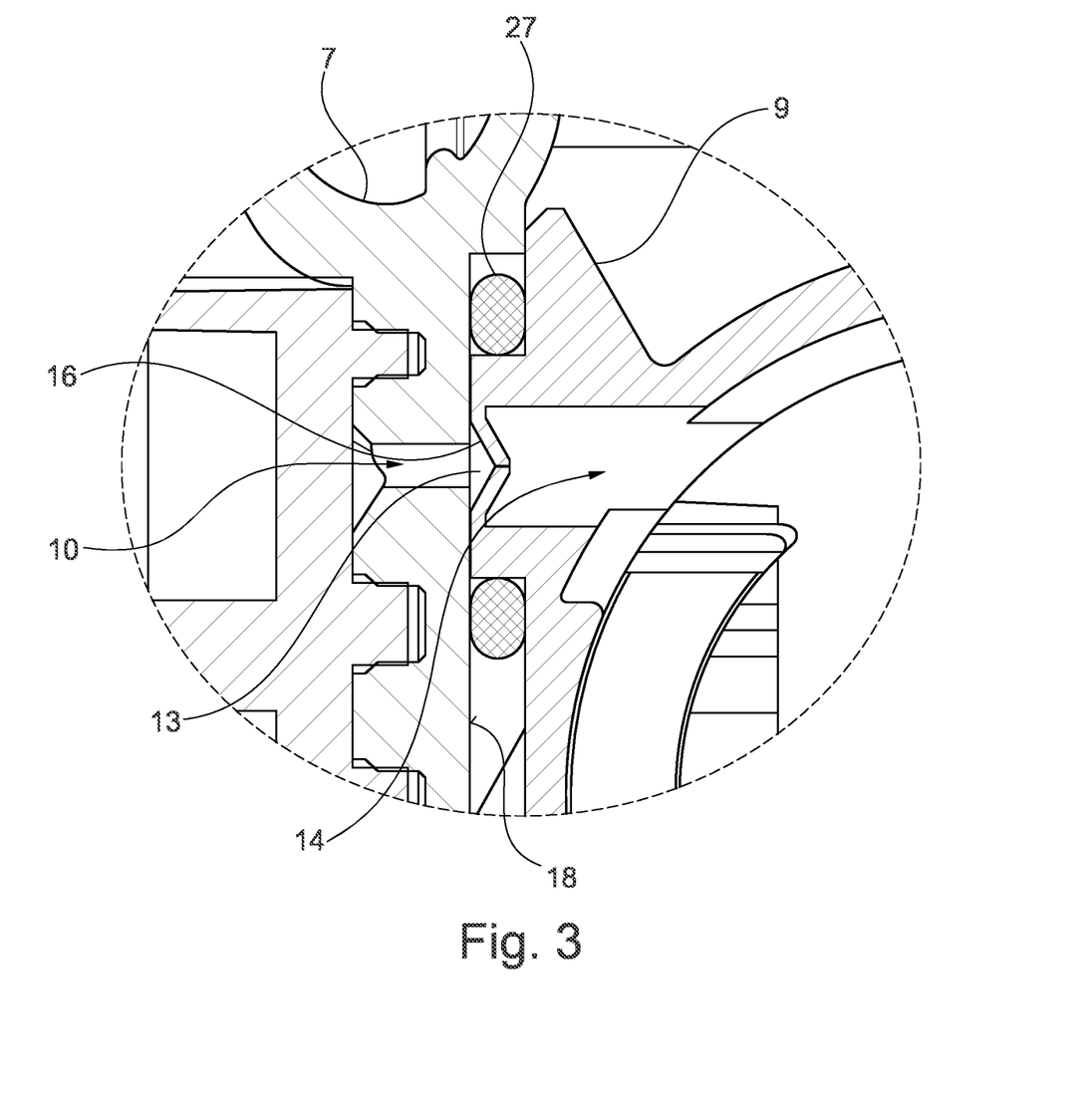
FIG. 3 shows a modified design of the arrangement according to FIG. 2.

In the embodiment according to FIG. 3 modified in comparison to FIG. 2, a separate sealing ring in the form of a commercially available O-ring is inserted between the deflection shell 9 and the end piece 7. An annular sealing section formed by the deflection shell 9 is omitted in this case.

Figure 4:
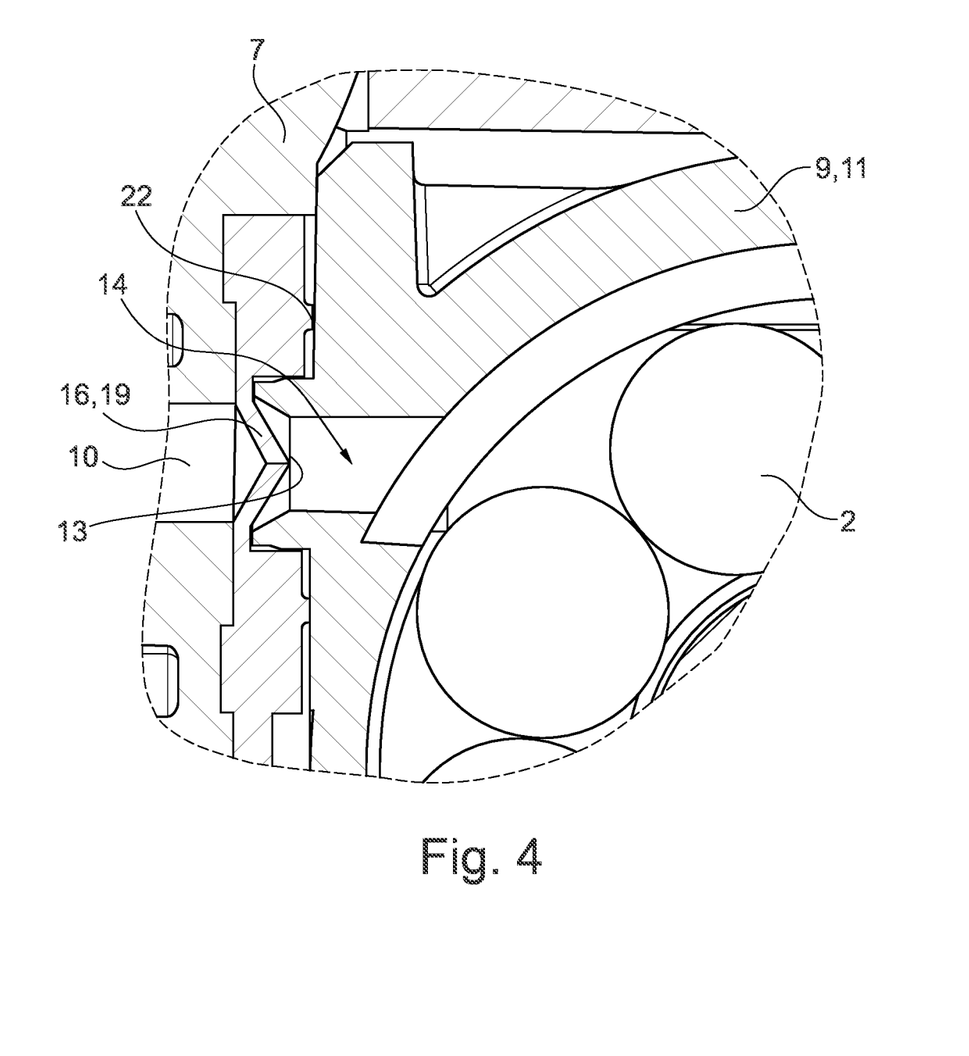
FIG. 4 shows, in a view analogous to FIG. 2, a detail of another guide carriage of a linear guide.
Figure 5:
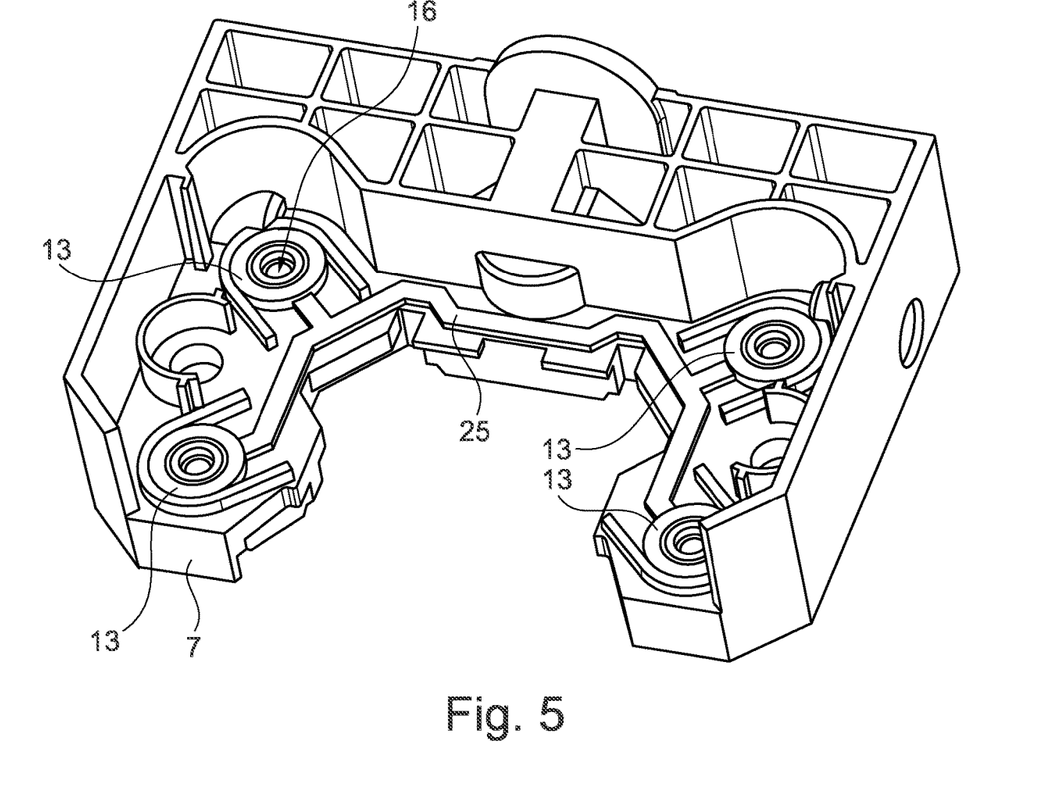
FIG. 5 shows a perspective view of an end piece of the guide carriage according to FIG. 4, FIGS. 6 to 8 show different variants of valves in guide carriages.

In the embodiment according to FIGS. 4 and 5, the geometric design of the valve 16 corresponds to the design according to FIGS. 1 and 2 and the design according to FIG. 3. According to FIGS. 4 and 5, however, the valve 16 is not integrated into the deflection shell 9, but into the end piece 7. Correspondingly, the annular sealing section 22 is also formed directly by the end piece 7 in this case. The valve 16 has conical walls 19, which are shown in FIG. 4 as well as in FIG. 2 and in FIG. 3 in the closed state.

Figure 6:
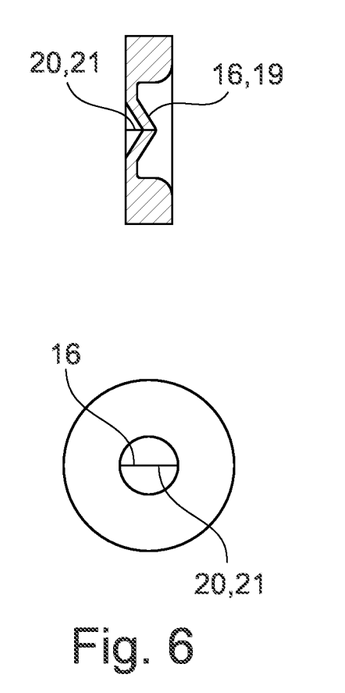
Figure 7:
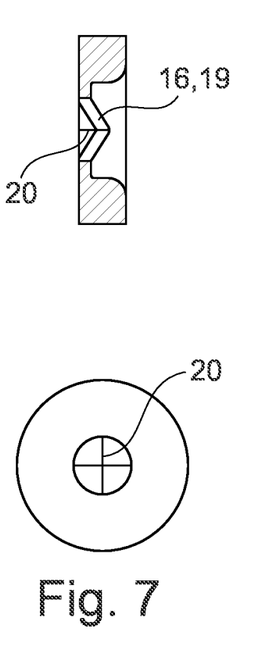
Figure 8:
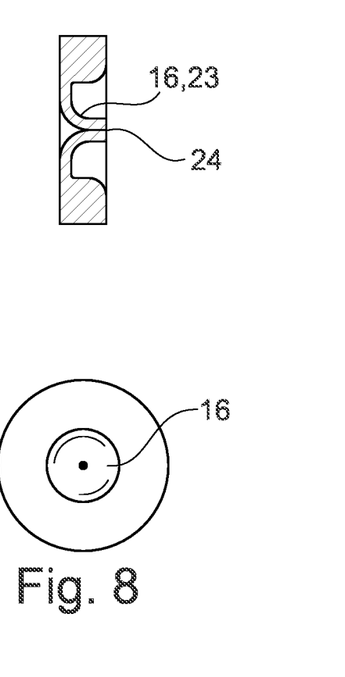

Further design options for the valve 16 are outlined in FIGS. 6 to 8. Each of these designs is suitable for the guide carriage 1 according to FIG. 1 and for the guide carriage according to FIG. 4 as well as for the exemplary embodiment according to FIG. 9. In FIGS. 6 to 8 can be seen slots 20, slot walls 21, walls 23 and a valve opening 24 formed by the respective valve 16. The various openings 20, 23 are produced either during the plastic injection molding process or subsequently by piercing.

To be able to produce the total of four valves 16 within the end piece 7 by injection molding technology in the variant according to FIGS. 4 and 5, the inside of the end piece 7 is provided with connecting webs 25 through which material, i.e., plastic, can flow during the injection molding process.

Figure 9:
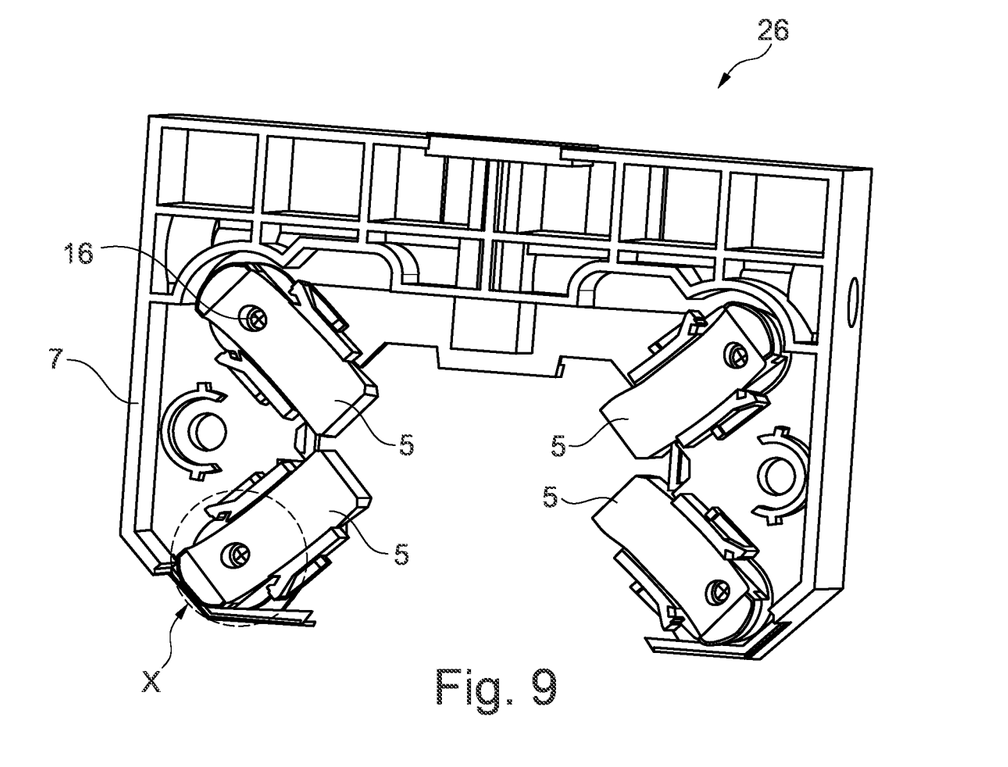
FIG. 9 shows a head piece of a further guide carriage of a linear guide.
Figure 10:
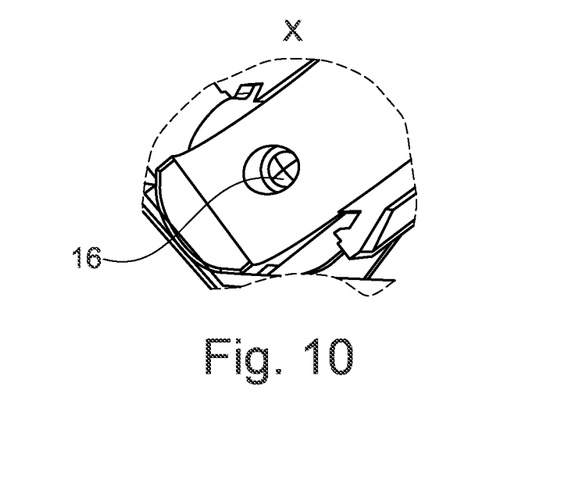
FIG. 10 shows a detail of the arrangement according to FIG. 9.

The embodiment according to FIGS. 9 and 10 differs from the embodiments according to FIGS. 1 to 5 in that the guide carriage 1 has two head pieces 26 on the end faces thereof, each of which combines the functions of a deflection shell 9 and an end piece 7.

LIST OF REFERENCE SYMBOLS

1 Guide carriage
2 Roll body
3 Load section
4 Return section
5 Deflection section
6 Support body
7 End piece
8 Circulation channel
9 Deflection shell
10 Lubricant channel
11 Outer deflection
12 Internal deflection 13 Supply point
14 Passage opening
15 Seal
16 Valve
17 Cover
18 Sealing surface
19 Conical wall
20 Slot
21 Slot wall
22 Annular sealing section
23 Wall
24 Valve opening
25 Connecting web
26 Head piece
27 Sealing ring

The invention claimed is:

1. A guide carriage of a linear guide, the guide carriage comprising:
 a circulation channel for rolling bodies, the circulation channel is formed from a load section, two deflection sections and a return section;
 a supply point configured for supplying lubricating agent from a lubricant channel to one of the deflection sections;
 a valve to prevent the back flow of lubricant from the circulation channel arranged in a deflection shell that delimits one of the deflection sections, the deflection shell being located in an end piece; and
 the valve is formed integrally with at least one of the deflection shell or the end piece, wherein the valve is surrounded by an annular sealing section which is formed as an integral component of the deflection shell.

2. The guide carriage according to claim 1, wherein the valve is formed integrally with the deflection shell.

3. The guide carriage according to claim 1, further comprising an annular extension formed by the deflection shell, wherein the annular sealing section is formed on an axial end surface of the annular extension.

4. A guide carriage of a linear guide, the guide carriage comprising:
 a circulation channel for rolling bodies, the circulation channel is formed from a load section, two deflection sections and a return section;
 a supply point configured for supplying lubricating agent from a lubricant channel to one of the deflection sections;
 a valve to prevent the back flow of lubricant from the circulation channel arranged in a deflection shell that delimits one of the deflection sections, the deflection shell being located in an end piece; and
 the valve is formed integrally with at least one of the deflection shell or the end piece,
 wherein the valve is surrounded by an annular extension formed by the deflection shell, and an annular sealing section is formed radially outside the annular extension and projects axially into abutment with the deflection shell.

5. The guide carriage according to claim 4, wherein the annular sealing section and the annular extension are spaced apart from each other in a radial direction.

6. A guide carriage of a linear guide, the guide carriage comprising:
 a circulation channel for rolling bodies, the circulation channel is formed from a load section, two deflection sections and a return section;
 an end piece with a supply point configured for supplying lubricating agent from a lubricant channel to one of the deflection sections;
 a valve to prevent the back flow of lubricant from the circulation channel arranged in the end piece or in a deflection shell that delimits one of the deflection sections, the deflection shell being located in the end piece; and
 the valve is formed integrally with at least one of the deflection shell or the end piece, and
 the valve is surrounded by an annular sealing section which formed as an integral component of the deflection shell.

7. The guide carriage according to claim 6, wherein the valve is surrounded by an annular extension of the deflection shell, and the annular sealing section is formed on an axial end surface of the annular extension.

* * * * *